June 23, 1970　　　J. LA MARCA　　　3,516,311
LATHE TOOL
Filed June 11, 1968
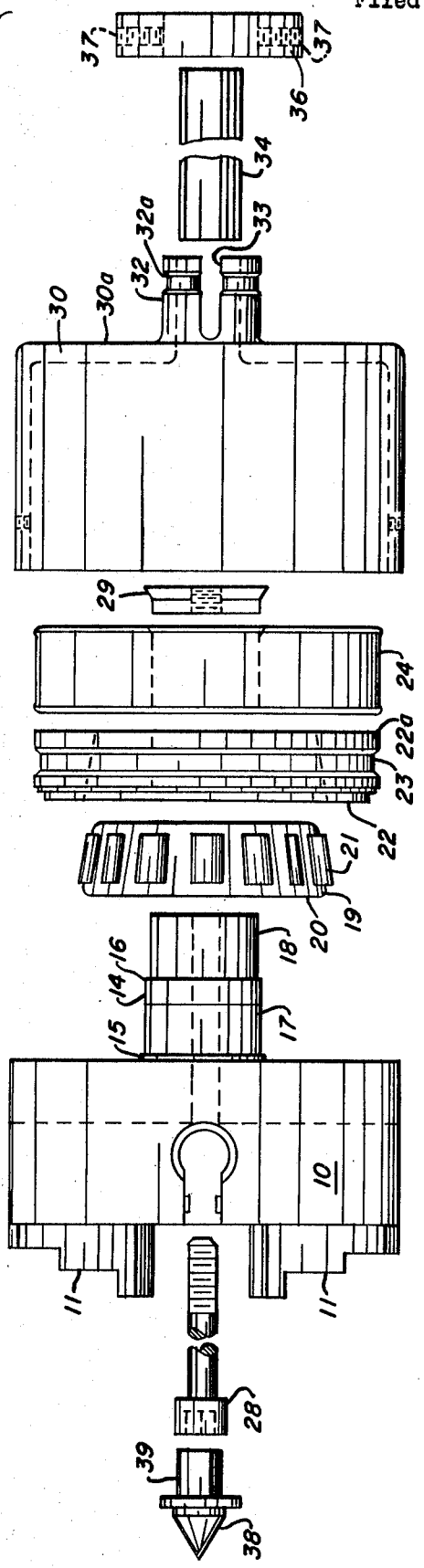
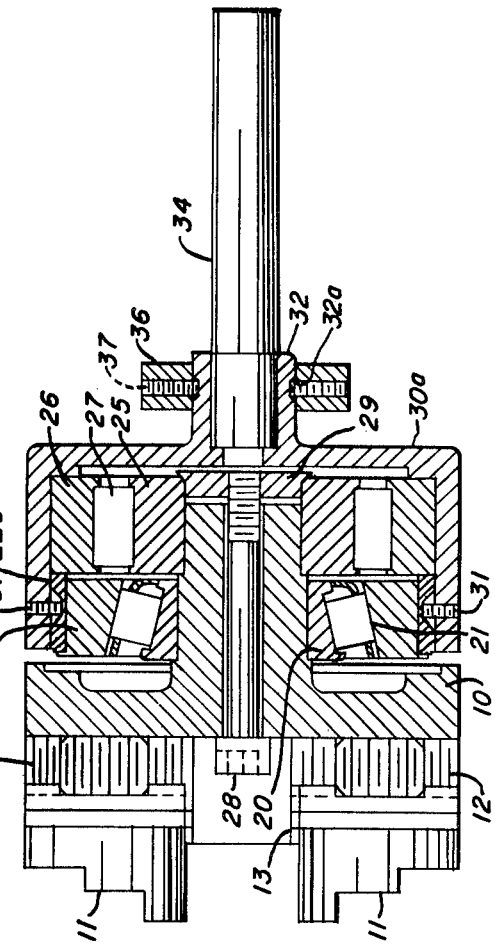
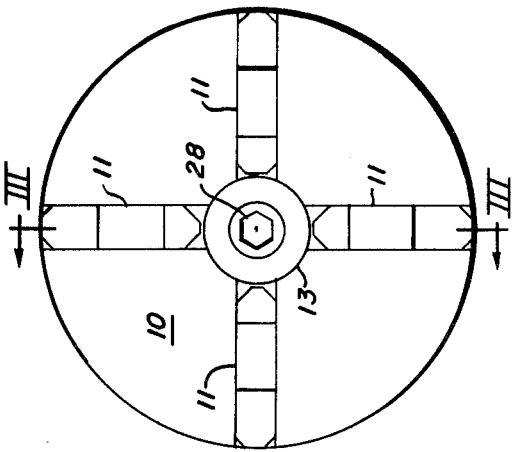
INVENTOR
JOHN LAMARCA
By
Parmelee Utyler & Welsh
Attorney United States Patent Office 3,516,311
Patented June 23, 1970

3,516,311
LATHE TOOL
John La Marca, 1312 Dormont Ave.,
Pittsburgh, Pa. 15216
Filed June 11, 1968, Ser. No. 736,100
Int. Cl. B23b 25/00
U.S. Cl. 82—38      3 Claims

ABSTRACT OF THE DISCLOSURE

The invention disclosed relates to a lathe tool which combines the advantages of a chuck and a live center in one tool at the tail stock end of an engine lathe.

---

The invention is an improvement over my two earlier patents, Lathe Live Center, Pat. No. 3,308,696 issued Mar. 14, 1967; and Lathe Tool, Pat. No. 3,315,551 issued Apr. 25, 1967.

There are many situations confronted when performing work on various sizes and shapes of work pieces in an engine lathe and, particularly, many problems are encountered in the manner of holding the work piece at the tail stock end of a lathe. The present invention combines the features of a multi-jaw chuck, such as a four-jaw chuck, and a live center. The chuck is mounted on the tail stock spindle with a bearing assembly, enclosed by a bearing housing such that the chuck is freely rotatable at the tail stock end. The jaws of the chuck can be positioned in the normal manner of chuck jaws for such purposes. A center member can be selectively positioned either in a central recess in the chuck or by holding the center itself in the jaws of the chuck whereby the center can be positioned in any desired offset relation with respect to the center of rotation of the chuck.

The invention will be more fully understood by those skilled in the art by reference to the following drawings:

FIG. 1 is an exploded view of a lathe tool according to the invention;

FIG. 2 is an end elevation looking into the chuck; and

FIG. 3 is a side elevation taken along the lines III—III of FIG. 2.

In the described embodiment there is shown a conventional four-jaw chuck 10 having jaws 11 which are movable radially toward and away from the center of the chuck by means of suitable screws 12. The front end of the chuck is provided with a central recess 13, for a purpose later described. The rear end of the chuck is provided with a stub shaft 14 which is machined with shoulders at 15 and 16 to provide bearing seats at 17 and 18. The first seat 17 comprises a section of the stub shaft between the shoulders 15 and 16, while the second seat 18 comprises a section from the shoulder 16 to the end of the stub shaft 14. A bevel bearing assembly 19 comprising an inner race 20 and a plurality of roller bearings 21 is positioned on the stub shaft on the bearing seat 17. The rollers 21 are disposed with their axes of rotation at an acute angle with respect to the center of rotation of the chuck. Over the bevel bearing assembly 19 there is positioned an annulus 22 which comprises an outer race 22 for the bevel bearings and a spacer annulus 22a for the bevel bearing and later described straight bearing assembly. As best seen in FIG. 3, the spacer member 22a abuts a forward flange or shoulder on race 22 and extends a short distance beyond the end of race 22. Member 22a is press fitted on the race 22 and is formed with a circumferential groove 23 for a purpose later described.

A second bearing assembly 24 is positioned on the stub shaft 14, on the bearing seat 18. Assembly 24 is a conventional straight bearing assembly having an inner race 25 and outer race 26 and a plurality of roller bearings 27 each mounted for rotation about an axis radial to the chuck center of rotation. This double bearing arrangement is effective to take up both radial and axial thrusts exerted during the turning of a workpiece. The entire bearing assembly is secured in place on the stub shaft 14 by means of a suitable bolt 28 and a threaded disc 29. The bolt is received through the central recess 13 on the chuck 10 and passes longitudinally therethrough. The disc 29 is tightened on the threaded end of the bolt 28 to hold the bearing assembly securely on the stub shaft 14. The disc is beveled to be received in a corresponding seat on the bearing assembly 24 so that the disc may be substantially flush with the end of the assembly 24. A cylindrical bearing housing 30 is positioned over the bearing assemblies and stub shaft and is held in place by means of suitable set screws 31 or the like passing through the side walls of the housing and engaging the groove 23 in annulus 22. The housing 30 is provided with an end wall 30a having a central collar 32 extending rearwardly therefrom, which collar is provided with longitudinal diametrically opposite slots 33. A tail stock spindle 34 is positioned in collar 32 into abutting relation with a flange or shoulder formed by a portion of end wall 30a. A clamping annulus 36 is positioned around the collar 32 and held in place by suitable set screws 37 or the like, which engage in circumferential groove 32a in collar 32 to restrain axial movements of the clamping annulus on the collar. The slots 33 in collar 32 allow the collar to yield slightly to better grip the spindle when the set screws 37 on the clamping annulus 36 are tightened. The spindle 34 is received in the tail stock end of an engine lathe (not shown) in a manner known in the art. A center member 38 is provided for a purpose later described.

With the assembly as shown and with the spindle 34 securely held in the tail stock end of the lathe, it is apparent that the chuck 10 is free to rotate relative to the housing 30 and spindle 34. A work piece may then be held in the chuck jaws by selectively positioning the chuck jaws 11 in any desired manner. If it is desired to use the tool of the invention as a live center, the center member 38 may be positioned in the central recess 13 or it may be positioned in offset relation to the center of rotation by holding the end portion 39 of the center member between the jaws 11 of the chuck.

With the tool just described, the locating of a work piece is made much easier and a wide variety of work pieces can be held with the tail stock end of the lathe with a minimum of effort. The tool provides great flexiblity in difficult work such as in the turning of eccentrics, in the truing of warped or damaged rolls or shafts, and in other difficult work situations.

While I have described one embodiment of the invention, it will be apparent to those skilled in the art that variations and modifications in the construction and arrangement of the parts are possible within the scope and spirit of the invention.

I claim:
1. A lathe tool comprising:
   (a) a multi-jaw chuck having a central recess therein adapted to receive a center member,
   (b) a stub shaft connected to and extending rearwardly from the chuck,
   (c) a bearing assembly comprising first and second bearings mounted on the chuck stub shaft at longitudinally spaced locations, the first bearing being a bevel bearing having a plurality of rollers each rotatable about an axis oriented at an acute angle with respect to the axis of rotation of the chuck, the second bearing being a straight bearing having a plurality of rollers each rotatable about an axis radial to the axis of rotation of the chuck, (d) a bearing housing around the bearing assembly and stub shaft, and (e) a spindle connected to the bearing housing, the arrangement being such that the chuck is freely rotatable with respect to the bearing housing and spindle.

2. A lathe tool as defined in claim 1 including a threaded member passing longitudinally through the chuck stub shaft, and a restraining member at each end of the threaded member adapted to hold the bearing assembly on the chuck stub shaft.

3. A lathe tool comprising:

(a) a multi-jaw chuck, (b) a stub shaft connected to and extending rearwardly from the chuck, (c) a bearing assembly mounted on the stub shaft, (d) a bearing housing around the bearing assembly and stub shaft having a rearward collar with a longitudinal slot therein, and (e) a spindle connected to the bearing housing, the arrangement being such that the chuck is freely rotatable with respect to the bearing housing and spindle, the spindle mounted with one end in the housing collar, and provided with a lug slidably received in the slot whereby the housing is restrained against rotation relative to the spindle.

References Cited

UNITED STATES PATENTS

| 1,688,040 | 10/1928 | Flinn | 82—33 |
| 2,496,545 | 2/1950 | Kraemer | 82—33 |

FOREIGN PATENTS 84,485  3/1920  Switzerland.

LEONIDAS VLACHOS, Primary Examiner

U.S. Cl. X.R.

82—45; 279—1